United States Patent
Burczyk

(10) Patent No.: US 8,844,967 B2
(45) Date of Patent: Sep. 30, 2014

(54) DEVICE FOR INFLATING AN AT LEAST TWO-PLY AIRBAG FOLDED TO FORM AN INFLATABLE BELT AND USED FOR A SAFETY SYSTEM OF A MOTOR VEHICLE

(75) Inventor: Christian Burczyk, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/697,998

(22) PCT Filed: May 7, 2011

(86) PCT No.: PCT/EP2011/002310
§ 371 (c)(1),
(2), (4) Date: Nov. 14, 2012

(87) PCT Pub. No.: WO2011/144305
PCT Pub. Date: Nov. 24, 2011

(65) Prior Publication Data
US 2013/0055919 A1 Mar. 7, 2013

(30) Foreign Application Priority Data
May 20, 2010 (DE) .......... 10 2010 021 007

(51) Int. Cl.
*B60R 21/18* (2006.01)
*B60R 21/26* (2011.01)

(52) U.S. Cl.
CPC *B60R 21/18* (2013.01); *B60R 21/26* (2013.01)
USPC .......................... 280/733; 280/736; 280/741

(58) Field of Classification Search
USPC .......... 102/530, 531; 280/733, 736, 737, 739, 280/741, 742
See application file for complete search history.

(56) References Cited

U.S. PATENT DOCUMENTS

| | | | | |
|---|---|---|---|---|
| 5,478,111 A | * | 12/1995 | Marchant et al. | 280/739 |
| 5,669,629 A | * | 9/1997 | Rink | 280/741 |
| 6,131,949 A | * | 10/2000 | Lewis et al. | 280/739 |
| 7,226,078 B2 | * | 6/2007 | Green et al. | 280/737 |
| 7,293,797 B2 | * | 11/2007 | Nakayasu et al. | 280/737 |
| 7,364,193 B2 | * | 4/2008 | Deckenhoff et al. | 280/739 |
| 7,637,534 B2 | * | 12/2009 | Schafer | 280/740 |
| 2005/0140128 A1 | | 6/2005 | Schafer | |

FOREIGN PATENT DOCUMENTS

| | | |
|---|---|---|
| DE | 10 2008 048 340 B3 | 1/2010 |
| DE | 10 2009 057 670 A1 | 6/2011 |
| EP | 1 056 894 B1 | 12/2002 |
| EP | 1 347 894 B1 | 9/2004 |
| EP | 1 702 815 A2 | 9/2006 |
| EP | 1 702 815 B1 | 4/2011 |

OTHER PUBLICATIONS

International Search Report (PCT/ISA/210) with English translation dated Jul. 27, 2011 (four (4) pages).
German Written Opinion (PCT/ISA/237) (six (6) pages).
German Office Action dated Oct. 12, 2010 (three (3) pages).

* cited by examiner

*Primary Examiner* — Paul N Dickson
*Assistant Examiner* — Laura Freedman
(74) *Attorney, Agent, or Firm* — Crowell & Moring LLP

(57) ABSTRACT

A device for inflating an at least two-layered air bag folded to form an inflatable belt for a safety system of a motor vehicle equipped with a gas generator is provided. The gas stream generated by the gas generator is directed onto the air bag from the outside and the gas stream produces an opening in at least one of the layers of the air bag in a physical process.

13 Claims, 4 Drawing Sheets

Figure 1:
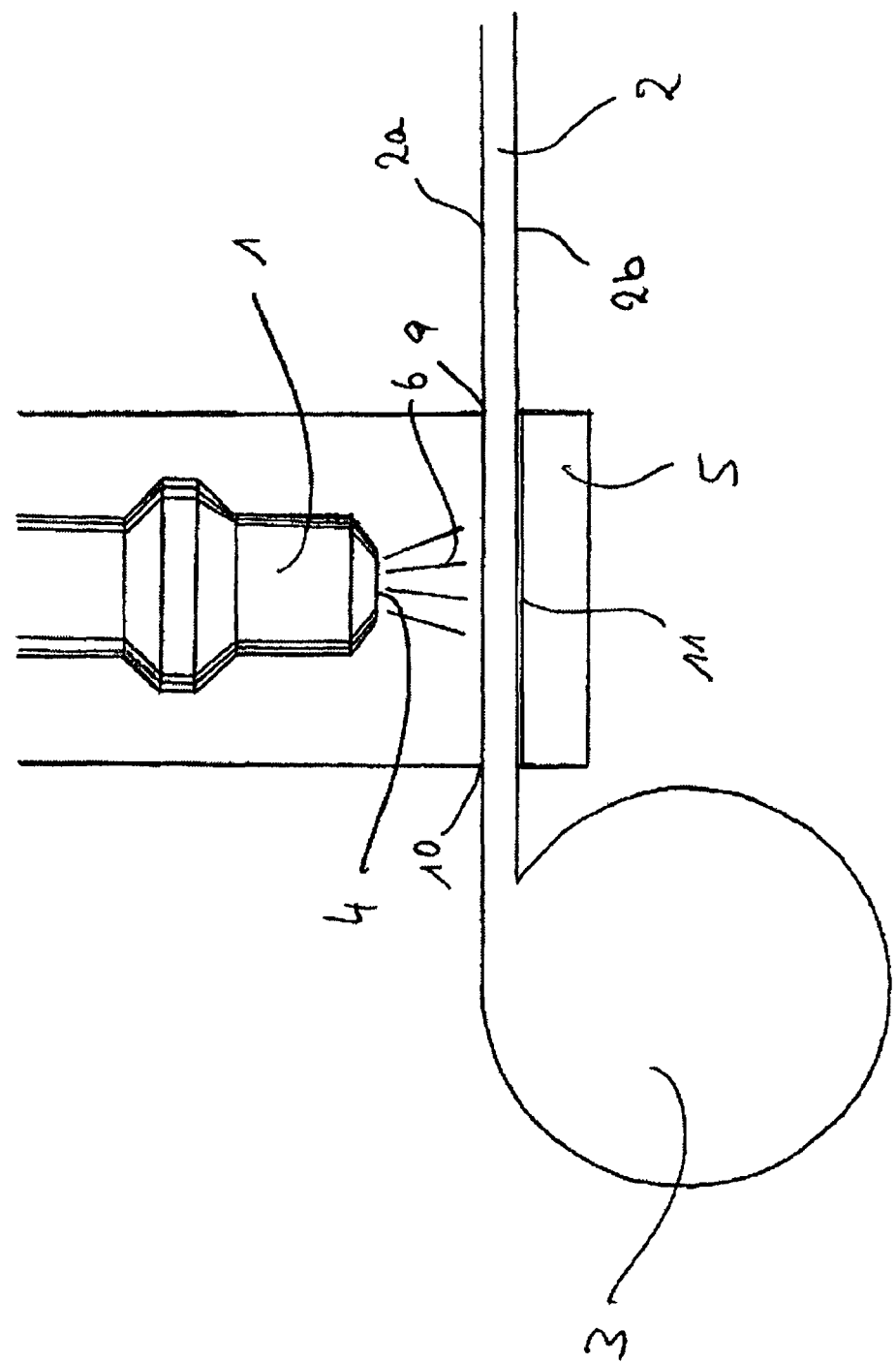

DEVICE FOR INFLATING AN AT LEAST TWO-PLY AIRBAG FOLDED TO FORM AN INFLATABLE BELT AND USED FOR A SAFETY SYSTEM OF A MOTOR VEHICLE

BACKGROUND AND SUMMARY OF THE INVENTION

Exemplary embodiments of the present invention relate to a device for inflating an at least two-layered air bag folded to form an inflatable belt for a safety system of a motor vehicle equipped with a gas generator.

Air bags are typically located in the steering wheel, in the instrument panel in front of the passenger, laterally on the B-post, below the steering wheel or in the seat and are inflated in an accident. The purpose of the air bags is to prevent the vehicle occupant from hitting the vehicle structure or hard parts of the vehicle, such as the steering wheel or the windshield, during the accident and is seriously injured. The inflated air bags can also alter the sequence of movements of the occupant in the course of his/her forward displacement, thereby, for example, avoiding the dipping or sliding through or under the seat belt which is known as "submarining". Such inflated air bags are further used as inflatable seat belts that are folded to form a belt and wound onto a belt retractor.

In order to inflate the air bags it is common to use gas generators connected to the air bag by a connecting piece. The gas stream generated by the gas generators is, for example, fed into the air bag via a gas passage, and additional gas lances may be provided to distribute the gas stream in the interior of the air bag.

European Patent Document EP 1 347 894 B1 discloses an air bag that is inflated via an inflation unit provided with a nozzle head. The inflation unit is connected to the air bag via the nozzle head in a gas-tight manner, for which purpose a connecting piece specifically adapted to the air bag and a corresponding design of the connecting region of the air bag itself are required.

Inflatable belts are basically subject to the problem of deciding at which point the gas generator is connected to the inflatable belt, because the belt is subject to repeated extraction and retraction movements. For this reason, inflatable belts are usually filled from the end fitting. Otherwise, a very complex filling operation via the belt latch is required.

European Patent Document EP 1 056 894 B1 discloses a two-layered inflatable single-part belt webbing, in particular for a seat belt, which is woven as a tubular belt webbing.

German Patent Document DE 10 2008 048 340 B3 describes a device for inflating an at least two-layered air bag for a safety system of a motor vehicle equipped with a gas generator. The gas stream generated by the gas generator is directed onto the air bag from the outside. By means of the gas stream, an opening can be burned into at least one of the layers of the air bag. In one embodiment, the gas stream has a temperature of at least 600 degrees.

The burning of the opening into the airbag is a chemical reaction that requires, in addition to a combustible material, an oxidant such as oxygen, with which the combustible material forms a chemical compound in the burning process, which is also known as combustion. To start the reaction, which then runs while giving off energy, an activating energy is required. Burning an opening into the airbag requires both a sufficient quantity of oxidant and a sufficiently high activating energy for starting the reaction, for example in the form of a correspondingly high temperature. The required activating energy depends, among other factors, on the combustible material. If even one of these preconditions is not met, it is not possible to burn an opening into the airbag.

To protect the occupant secured by the air bag against higher temperatures of the gas stream fed into the air bag, suitable protective measures are required, for example a sufficiently thick cover for the air bag, so that the temperature at the outside of the cover facing the occupant is tolerable for the occupant after the air bag has been inflated. The higher the temperature of the gas stream, the more complex such protective measures will be.

Exemplary embodiments of the present invention are directed to the problem of improving a device for inflating a two-layered air bag folded to form an inflatable belt.

In accordance with the present invention the gas stream generated by the gas generator is directed onto the air bag from the outside and the gas stream produces an opening in at least one of the layers of the air bag in a physical process.

The opening is, for example, produced by an at least partial melting or tearing of at least one of the layers of the air bag in a region to which the gas stream is applied. Several physical processes can be combined to produce the opening. The material of the air bag can, for example, be melted by a gas stream temperature above the melting point of the material, and this melt can be blown away by the gas stream itself. In a material commonly used for an air bag or for a belt webbing, the melting point is significantly below an activating energy required for burning the material. The material can, for example, be torn by the kinetic energy of the gas stream. The material of the air bag can also be softened or weakened by a gas stream temperature that is below its melting point but above ambient temperature, making it easier to tear the material.

Producing an opening in the air bag in a physical process offers several advantages compared to burning an opening. The physical process does not require an oxidant such as oxygen, which has to be available in sufficient quantities for burning in the gas stream or in its immediate surroundings. Further, there is no need to exceed an activating energy for the physical process, which allows the gas stream to have a lower temperature. As a result, the measures to protect the occupant secured by the air bag against the temperature of the gas stream fed into the air bag can be made less complex.

It was surprisingly found that the air bag even unfolds if the gas stream is directly oriented onto the air bag from the outside, so that no connecting ports or connecting pieces are required. The gas stream is then directly fed through the layer of the air bag that is subjected to the gas stream, the introduction of the gas stream being facilitated by an opening produced by the gas stream in at least one of the layers of the air bag.

In accordance with the present invention the direction of the gas stream and the unfolding direction of the air bag as provided enclose an angle of less than 90 degrees. In this way, the orientation of the gas stream already determines the unfolding direction, and the inflation of the air bag is accelerated. This further produces an undulation in the layer exposed to the gas stream, so that this layer is subjected to an additional mechanical stress and the production of the opening is accelerated further.

In an advantageous embodiment, the air bag is designed as an inflatable belt in such a way that it at least partially meets the requirements of a belt webbing of a seat belt for protecting vehicle occupants, in particular in terms of tear resistance and expandability. An example for such belt webbing is described in European Patent Document EP 1 056 894 B1.

In order to avoid damage to adjacent parts in the motor vehicle by the gas stream and in order to use the gas stream optimally for inflating the air bag, a housing encapsulates the region of the air bag onto which the gas stream is directed, the gas stream and at least the region of the gas generator where the gas stream emerges.

The gas generator can be arranged opposite the air bag without touching it. In this way, the air bag is only loaded by the impinging gas stream, and the emerging gas stream can develop before hitting the layer of the air bag, so that it has the necessary thermal and kinetic energy for producing the opening. The phrase "without touching" should be understood in this context to mean that there is no contact between the gas outlet surface of the gas generator and the air bag, but the housing of the gas generator may of course be in contact with the air bag.

Due to the device according to the invention, the belt can now be filled at any point, for example at an exit point from a belt retractor.

The device can comprise a guide for the belt, so that the relative arrangement of individual components, and in particular the distance of the belt from the gas generator, remains unchanged even while the belt is retracted or extracted.

In one embodiment, the belt is blocked in the direction of belt extraction at the time when the gas generator is ignited. This prevents any movement of the belt in the direction of belt extraction that may be caused by the impinging gas stream and thus any movement of the point on the belt that is hit by the gas stream.

BRIEF DESCRIPTION OF THE DRAWING FIGURES

Figure 2:
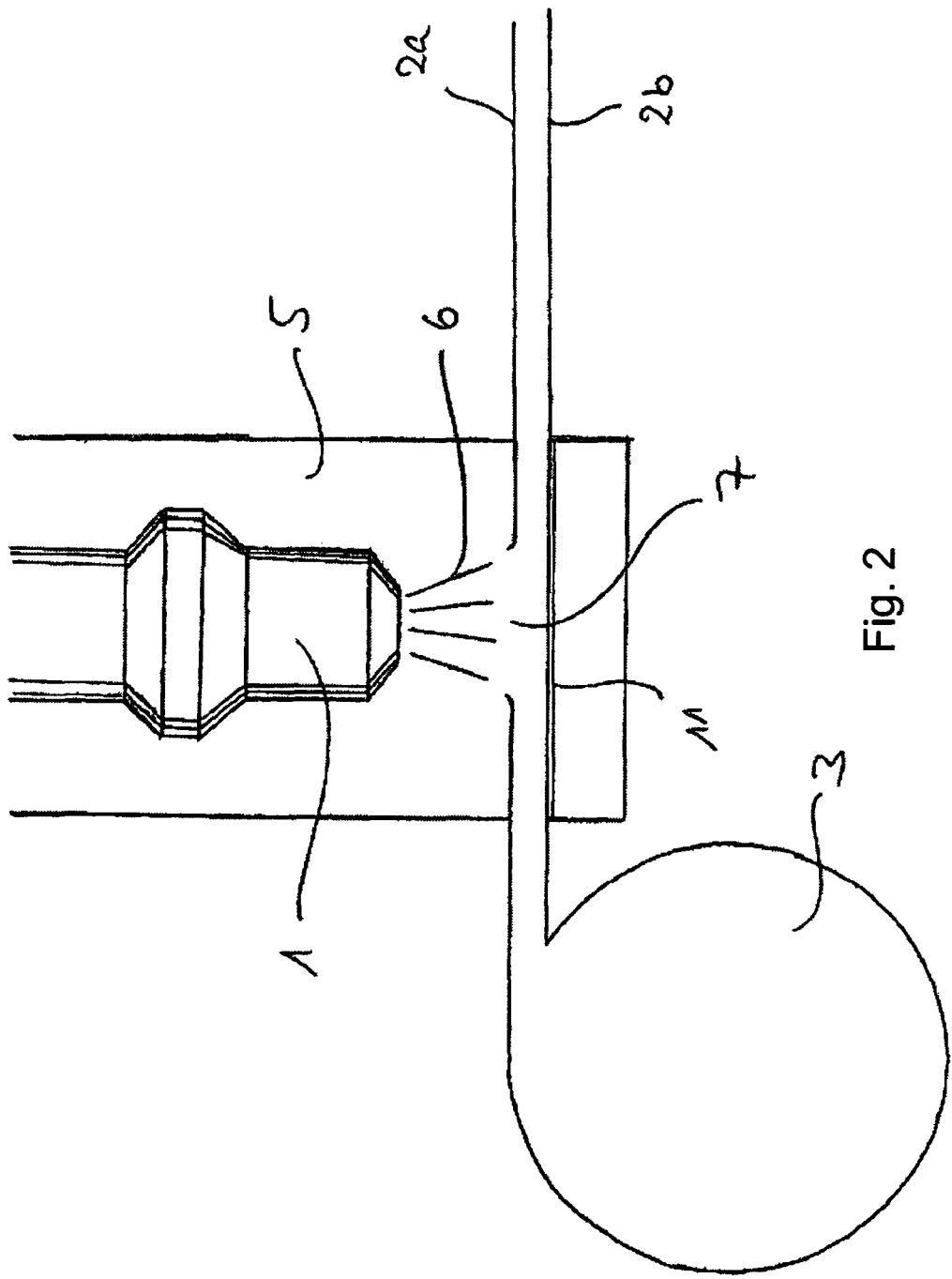
Figure 3:
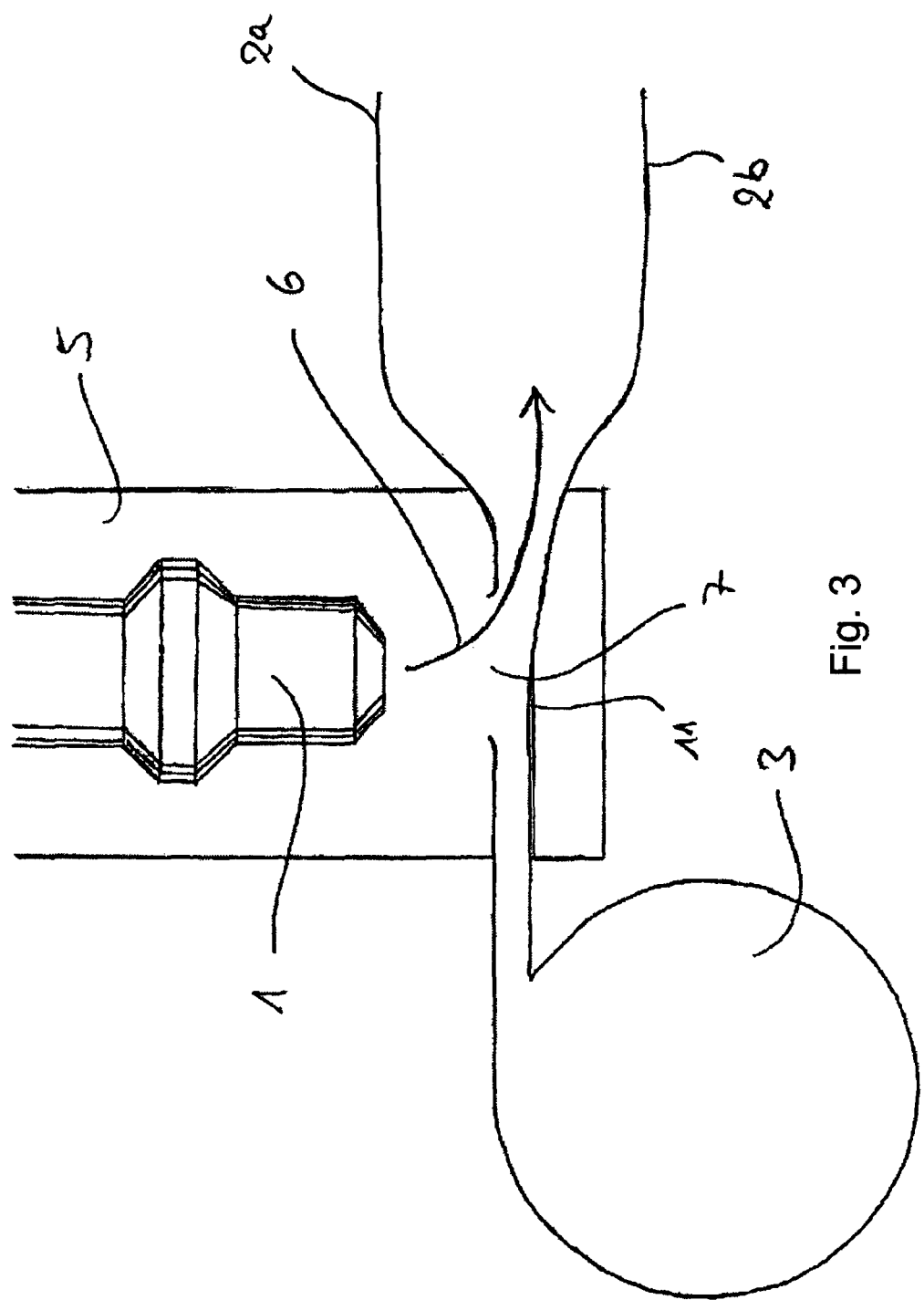
Figure 4:
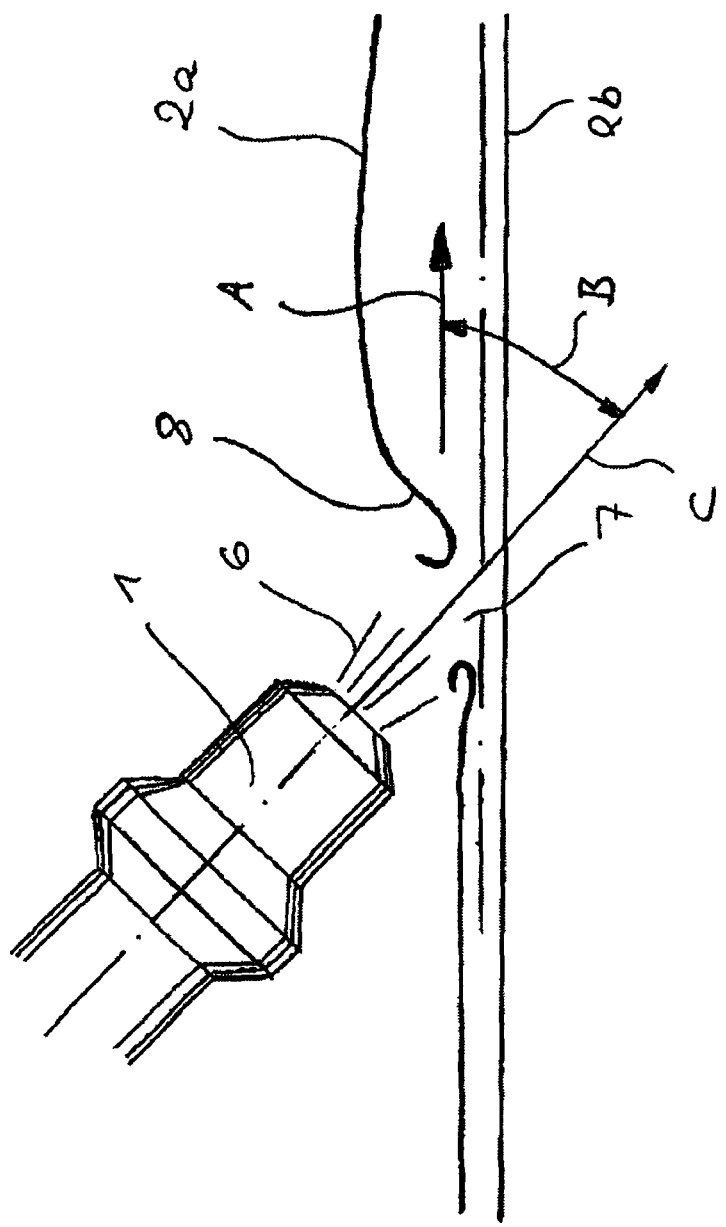

The invention is explained in greater detail below with reference to a preferred embodiment; the figures show in detail:

FIG. 1: a device for inflating an inflatable belt at the time of the ignition of the gas generator;

FIG. 2: the device for inflating an inflatable belt at the time of the production of the opening;

FIG. 3: the device for inflating an inflatable belt at the time of the unfolding of the inflatable air bag; and FIG. 4: the device for inflating an inflatable belt with the gas generator in an inclined position.

DETAILED DESCRIPTION

FIGS. 1 to 3 show a device according to the invention for inflating an air bag 2 designed as an inflatable belt. Instead of the inflatable belt, any other air bag of a safety system can be inflated using the device as well. The inflatable belt 2 is made up of two layers 2a and 2b, which are joined to each other at the sides and can be inflated to form a tube. In the non-inflated state, the inflatable belt 2 is folded to form a belt of conventional geometry and reeled onto the retractor 3, which is illustrated symbolically. To inflate the inflatable belt 2, a gas generator 1 is provided, through the end-face outlet openings 4 of which a gas stream 6 emerges following the ignition of the gas generator 1. The gas stream 6 is directed onto the layer 2a of the belt 2.

In a preferred embodiment, the gas stream 6 has a temperature of less than 600 degrees Celsius, which makes the protection of the occupant secured by the belt 2 against excessively high temperatures a less complex task. An example for a less complex design is an inflatable belt made of a thinner woven fabric than would be required for a gas stream with a temperature of more than 600 degrees Celsius. The thinner fabric offers the additional advantage that an opening can be produced more easily than in a thicker fabric. A gas stream 6 with a particularly low temperature can, for example, be generated in a so-called cold gas generator, which is in one embodiment substantially filled with compressed helium.

The gas generator 1 is arranged at a distance from the belt 2 without touching the latter, so that it is not loaded by the gas generator 1 and the gas stream 6 can develop fully before hitting the layer 2a. The phrase "without touching" refers to the gas outlet surface in which the outlet openings 4 are located. A development of the gas stream 6 includes, for example, the acceleration of the gas stream 6 as the gas, which is under pressure when leaving the gas generator 1, expands, ensuring a kinetic energy of the gas stream 6 that is high enough to produce an opening in one of the layers of the air bag. The development of the gas stream 6 can also involve a cooling of the gas stream 6 as the gas emerging from the gas generator expands. The gas generator 1, the gas stream 6 and the part of the belt 2 that is subjected to the gas stream 6 are encapsulated in a housing 5, so that the gas stream 6 cannot damage any adjacent parts in the motor vehicle or generally enter the interior of the vehicle. The passages of the belt 2 through the walls of the housing 5 at the same time represent guides 9 and 10, through which the belt 2 is guided in a predetermined position at a constant distance from the gas generator 1. To prevent an escape of the belt 2 under the impinging gas stream 6, a support 11 is additionally provided on which the layer 2a of the belt 2 rests.

Due to the arrangement of the device on a belt retractor 3, the inflatable belt 2 can be inflated in any position, and irrespective of the extracted length, the diagonal belt adjoining the belt retractor, which is also known as shoulder belt, is inflated first either directly or indirectly, without having, as in the case of filling from the end fitting, to inflate the lap belt first and the diagonal belt only later while the gas flows through the deflection point in the latch plate. In this way, the diagonal belt, which determines the load placed on the occupant's chest, is reliably inflated without incurring the risk that the passage of gas through the deflection point could be interrupted by the load in the belt 2 and the diagonal belt could not be inflated.

FIG. 2 shows the identical device at a time at which the gas stream 6 has already produced an opening 7 in the layer 2a. As the gas stream 6 can now escape into the belt 2 between the layers 2a and 2b, the pressure acting on the layer 2b is automatically lower. In the further course of the inflation of the belt 2, the gas stream 6 then enters between the layers 2a and 2b and inflates the inflatable belt 2. In this process, the belt retractor 3 is advantageously blocked, preventing an unreeling of the belt 2 under the inflation pressure.

FIG. 4 shows a slightly modified embodiment of the invention, in which the gas generator 1 is slightly inclined, so that the gas stream 6 emerging in direction C and the unfolding direction A enclose an angle B of less than 90 degrees. By inclining the gas generator 1, the inflation process as such is accelerated on the one hand, because the gas stream 6 already has an orientation which facilitates its entry in the unfolding direction A. On the other hand, the production of the opening 7 is facilitated, because the gas stream 6 impinging on the layer 2a causes the layer 2a to undulate, i.e., it applies a mechanical load acting in the longitudinal direction of the belt 2. Further, the opening 7 in the undulation 8 already has an orientation that contributes to the predetermination of the direction of inflow towards the unfolding direction A.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device, comprising:
a gas generator configured to inflate an at least two-layered air bag folded to form an inflatable belt for a safety system of a motor vehicle,
wherein the gas generator is configured so that
a gas stream generated by the gas generator is directed directly onto the air bag from outside of the air bag, and
the gas stream produces an opening in at least one of the layers of the air bag in a physical, non-chemical process,
wherein the gas generator is a cold gas generator configured to produce the gas stream with a temperature of less than 600 degrees Celsius, and the opening is produced in the at least one of the layers irrespective of extracted length of the inflatable belt.

2. The device according to claim 1, wherein the physical process involves a melting or tearing of at least a part of a region of the air bag to which the gas stream is applied.

3. The device according to claim 1, wherein a direction of the gas stream and an unfolding direction of the air bag enclose an angle of less than 90 degrees.

4. The device according to claim 1, a region of the air bag onto which the gas stream is directed, the gas stream, and at least that region of the gas generator where the gas stream emerges are comprised in a housing.

5. The device according to claim 1, wherein the gas generator is arranged opposite the air bag without touching, having a distance of no more than 20 mm from the air bag.

6. The device according to claim 1, wherein the device is mounted on a belt retractor of the inflatable belt or comprises a guide for the inflatable belt.

7. The device according to claim 1, wherein the inflatable belt is arranged to move at a constant distance with respect to the gas generator.

8. The device according to claim 1, wherein the inflatable belt is blocked in an extraction direction at a time of ignition of the gas generator.

9. The device according to claim 1, wherein the air bag is supported on a side which is remote from the gas generator.

10. A method, comprising:
inflating, by a gas generator, an at least two-layered air bag folded to form an inflatable belt for a safety system of a motor vehicle, wherein the inflation comprises
directing a gas stream generated by the gas generator directly onto the air bag from outside of the air bag, and
producing, by the gas stream, an opening in at least one of the layers of the air bag in a physical, non-chemical process,
wherein the gas generator is a cold gas generator configured to produce the gas stream with a temperature of less than 600 degrees Celsius, and the opening is produced in the at least one of the layers irrespective of extracted length of the inflatable belt.

11. The method according to claim 10, wherein the physical process involves a melting or tearing of at least a part of a region of the air bag to which the gas stream is applied.

12. The method according to claim 10, wherein a direction of the gas stream and an unfolding direction of the air bag enclose an angle of less than 90 degrees.

13. The method according to claim 10, further comprising:
blocking the inflatable belt in an extraction direction at a time of ignition of the gas generator.

* * * * *